United States Patent [19]

White

[11] Patent Number: 5,672,269

[45] Date of Patent: Sep. 30, 1997

[54] FILTER/PRESSURE RELIEF ASSEMBLY FOR AN ADHESIVE SUPPLY UNIT

[75] Inventor: James B. White, Nashville, Tenn.

[73] Assignee: Illinois Tool Works Inc., Glenview, Ill.

[21] Appl. No.: 610,087

[22] Filed: Feb. 29, 1996

[51] Int. Cl.$^6$ .................................................... B01D 35/147
[52] U.S. Cl. ......................... 210/130; 210/194; 210/234; 425/197
[58] Field of Search .................................... 210/130, 194, 210/232, 234, 445, 450, 451, 455, 433.1; 425/197; 118/603, 610

[56] References Cited

U.S. PATENT DOCUMENTS

| 3,495,299 | 2/1970 | Chazal | 425/197 |
| 3,815,788 | 6/1974 | Reighard et al. | |
| 3,912,630 | 10/1975 | Reighard et al. | 210/130 |

FOREIGN PATENT DOCUMENTS

| 93/01879 | 2/1993 | WIPO | 210/130 |

*Primary Examiner*—Joseph W. Drodge
*Attorney, Agent, or Firm*—Schwartz & Weinrieb

[57] ABSTRACT

A filter and pressure relief assembly for an adhesive supply unit comprises an adhesive supply hopper (12), a filter basket (20) disposed within a cavity (18) defined within a filter block (16), and a filter plug (22) for retaining the filter basket (20) within the filter block (16). Inlet port (32) provides an infeed of adhesive from the hopper (12), an outlet port (36) leads to an applicator, and a return port (54) and conduit (56) return adhesive back to the hopper (12). The filter plug (22) contains a pressure relief valve (44) which opens and connects the inlet port (32) to the return port (54) and conduit (56) so as to return adhesive to the hopper (12) under over-pressurized conditions, and a pair of O-ring members (100, 102) for respectively engaging small and large diameter regions (104, 106) of the cavity (18). A slide plate (66) is movable between three positions (82, 80, 78) and is operatively engaged with the filter plug (22) so as to respectively retain the filter plug (22) at a full retention and a partial retention position within the filter block (16), or permit release of the filter plug (22) and the filter basket (20) from the filter block (16). When the filter basket (20) is to be removed from the filter block (16), the slide plate (66) is moved to its second position (80) at which the filter plug (22) moves upwardly within the filter block (16) such that the lower O-ring member (102) disengages the small diameter region (104) of the cavity (18) so as to relieve the pressure within the system and permit adhesive to return to the hopper (12), the upper O-ring member (100) maintaining the sealing of the system. The slide plate (66) is then moved to the release position (78) so as to permit the filter plug (22) and the filter basket (20) to be removed safely from the filter block (16) without any forceful discharge of adhesive from the system.

20 Claims, 5 Drawing Sheets

FILTER/PRESSURE RELIEF ASSEMBLY FOR AN ADHESIVE SUPPLY UNIT

FIELD OF THE INVENTION

The present invention relates generally to hot melt adhesive supply units or systems, and more particularly to a new and improved filter and pressure relief assembly for use in connection with the adhesive supply unit so as to significantly improve the operational safety of the system as well as to facilitate the safe replacement of the filter component when the latter needs to be replaced.

BACKGROUND OF THE INVENTION

Conventional filter assemblies currently used in connection with, for example, hot melt adhesive supply units comprise a filter component which is usually held in place within the filter block by means of a threaded plug which bears against the filter component. When the filter component is to be replaced after a predetermined period of use, the threaded plug is removed from the filter block in order to permit access to and removal of the filter component from the filter block. Removal of the threaded plug and the filter component is of course accomplished or performed after operation of the system pumps has been terminated. Nevertheless, depending upon the particular structure of particular components utilized within the system, residual pressure is often still present within the system and when the threaded plug is removed from such conventional filter blocks, hot melt adhesive can be forcefully ejected out of the filter block assembly thereby posing a significant safety hazard to the operators.

The conventional filter assemblies also usually comprise only a single sealing mechanism. Consequently, if such sealing mechanism should fail, significant safety and operational problems will develop. In a similar manner, during operation of the adhesive applicator system, pressure conditions within the system may be elevated to levels which are significantly higher than those experienced during normal applicator operations. For example, when the application of adhesive is terminated, that is, during normal ON/OFF cycling of the system, the system will experience a pressure increase. Alternatively, if debris is present within the applicator per se or within the filter component, the system will likewise experience a pressure increase. Still further, if the temperature level of the adhesive is, for some reason, not properly maintained, such as, for example, due to a defective thermostat or heat sensor, the adhesive will not exhibit proper flow parameters or characteristics whereby, again, the system will experience an increase in operative pressure. Means must therefore be provided in order to accommodate such increased pressure conditions or values in order to eliminate any potential safety hazards to both the system equipment as well as to operating personnel.

A need therefore exists in the hot melt adhesive applicator art for a system in which improved safety mechanisms are incorporated in order to protect both the system per se and operating personnel from pressurized conditions attendant the operations of the adhesive supply units or systems.

OBJECTS OF THE INVENTION

Accordingly, it is an object of the present invention to provide a new and improved pressure relief assembly for use in conjunction with the filter component of a hot melt adhesive supply unit which overcomes the various drawbacks of conventional filter systems incorporated within filter block assemblies of adhesive supply units.

Another object of the present invention is to provide a new and improved pressure relief assembly for use in conjunction with the filter component of a hot melt adhesive supply unit which provides improved operational safety characteristics for both the adhesive supply equipment as well as for operational personnel.

A further object of the present invention is to provide a new and improved pressure relief assembly for use in conjunction with the filter component of a hot melt adhesive supply unit which permits the filter component to be readily removed from and replaced within the system without the necessity of the maintenance personnel to use any special tools.

SUMMARY OF THE INVENTION

The foregoing and other objectives are achieved in accordance with the present invention through the provision of a filter and pressure relief assembly for use in conjunction with an adhesive supply unit wherein a filter block is fixedly mounted upon a hopper of the adhesive supply unit within which a supply of the adhesive is maintained. A pump conveys the adhesive from the supply hopper to the filter block, and a pair of filter components are disposed within lower end portions of a pair of cavities defined within the filter block. Filter plugs are disposed within upper end portions of the cavities, and a spring-biased pressure relief valve is seated within each filter plug so as to provide pressure relief recirculation of the adhesive back to the hopper when system conditions so require. An adjustment screw is threadedly disposed within the upper end portion of each filter plug so as to adjust the pressure level at which the pressure relief valve will be operative. Each filter plug is also provided with a pair of vertically spaced O-rings which provide redundancy sealing in the case of a failure of one of the O-rings, and the filter plugs are retained within the filter block by means of slide members or plates. Each slide member or plate is movable between three different positions corresponding, in effect, to full retention of the filter plugs and the filter components within the filter block, partial retention of the filter plugs and filter components within the filter block, and zero retention or release of the filter plugs and filter components from the filter block. The lower or primary O-ring of each filter plug engages a first peripheral section of its filter block cavity, while the upper or secondary O-ring engages a second peripheral section of the filter block cavity, the second peripheral section of the filter block cavity having a larger diametrical extent than that of the first peripheral section of the filter block cavity.

The recirculation flow path from the filter block back to the supply hopper is interposed between the primary and secondary O-ring such that any recirculation flow of adhesive back to the supply hopper, during operation of the system, is only conducted through the pressure relief valve. However, when either one of the filter plugs and filter components is to be removed from the filter block, the respective slide plate is moved from its full retention position to its partial retention position which permits the respective filter plug to move upwardly, a predetermined limited amount, within the filter block cavity. In this manner, the lower primary O-ring of such filter plug is now disposed within the larger diameter section of the filter block cavity so as to relieve residual pressure within the system, the recirculation flow path is at least partially uncovered, and the adhesive within the system is able to be recirculated back to the supply hopper under the reduced pressure conditions. The upper secondary O-ring of the particular filter plug is still in its sealing condition with respect to the upper, large diameter section of the filter block cavity so that hot adhesive is not able to be forcefully ejected out from the filter block and therefore does not present any safety hazard to the operator personnel.

It may thus be seen that the filter and pressure relief assembly of the present invention exhibits improved safety features, and in addition, since the slide plate assembly permits or facilitates the removal of the filter plug and filter components, no special tools are required in order to replace the filter components within the filter block.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
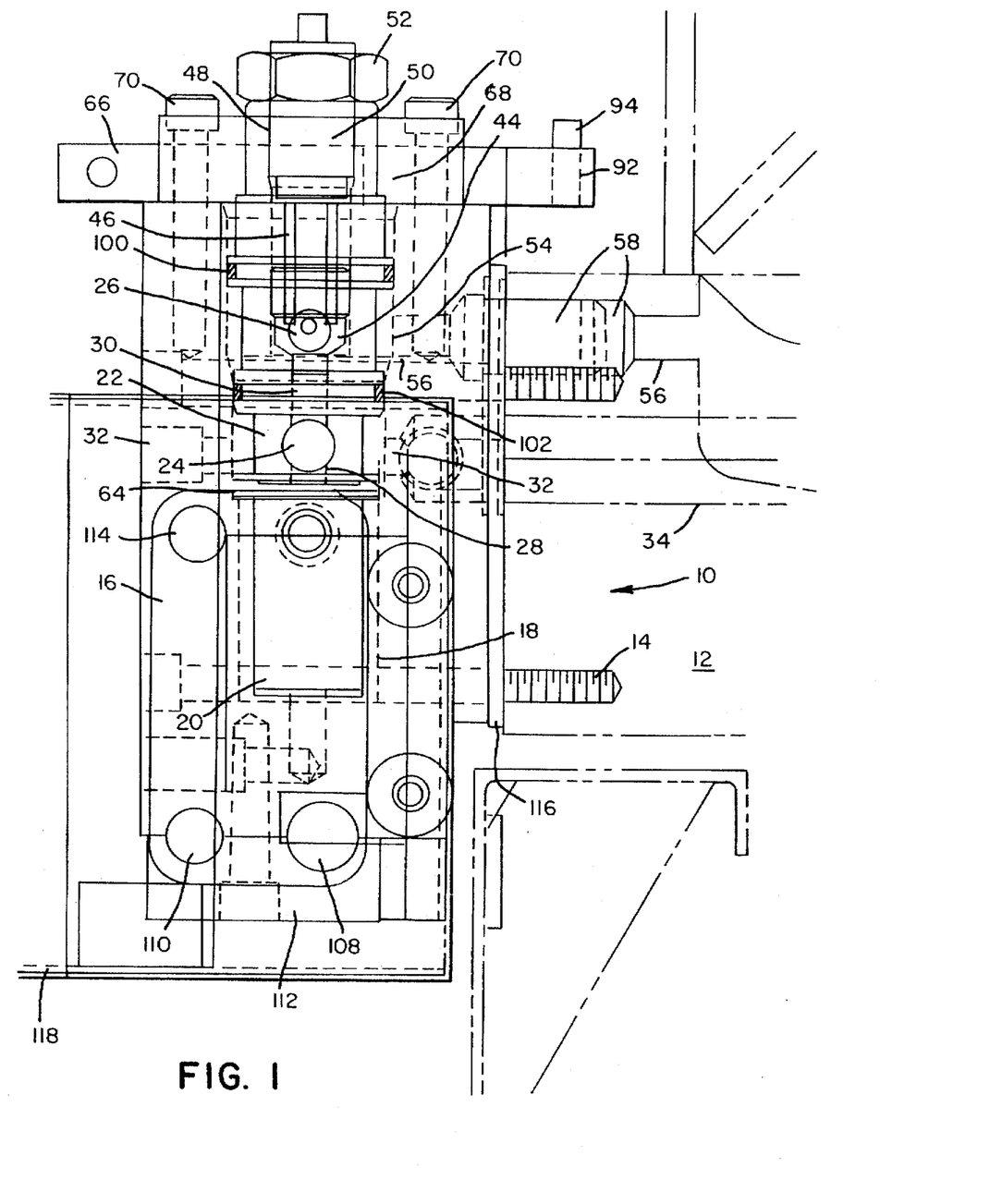
FIG. 1 is a side elevational view of the new and improved filter and pressure relief assembly for use in connection with an adhesive supply unit as constructed in accordance with the principles of the present invention.
Figure 2:
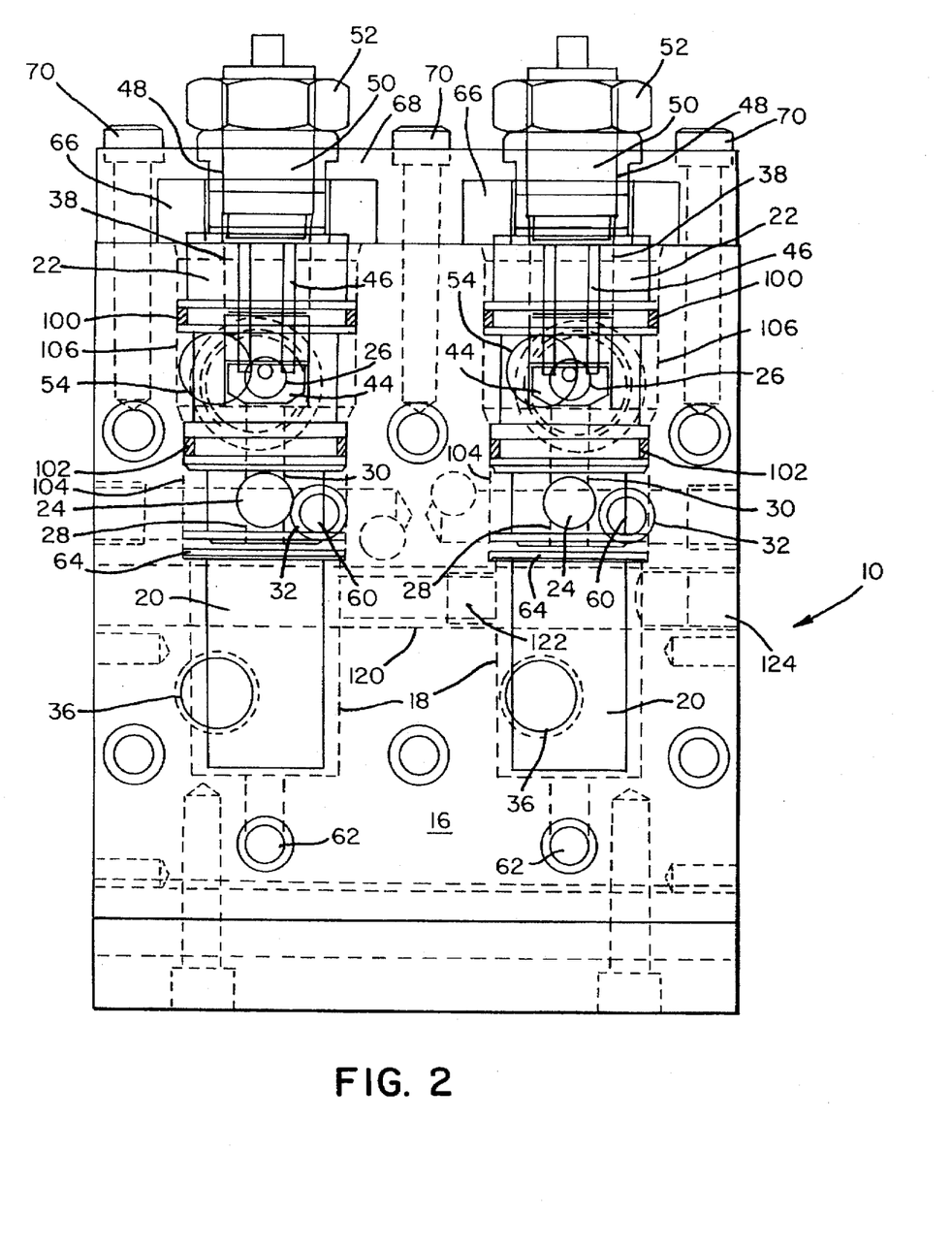
FIG. 2 is a front elevational view of the filter and pressure relief assembly of FIG. 1.

Referring now to the drawings, and more particularly to FIGS. 1 and 2 thereof, the filter and pressure relief assembly, constructed in accordance with the principles of the present invention for use in conjunction with an adhesive supply unit, is generally indicated by the reference character 10. The assembly 10 is fixedly mounted upon an adhesive supply hopper 12 by means of a plurality of screw or bolt fasteners 14, and the assembly 10 comprises a filter block 16 within which is defined a pair of substantially vertically extending cavities 18. A filter basket 20 is disposed within the lower part or end of each one of the cavities 18, while a filter plug 22 is disposed within the upper part or end of each one of the cavities 18.

Figure 3:
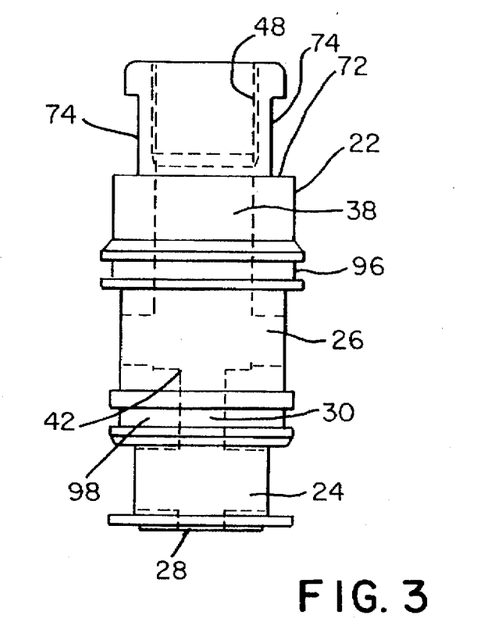
FIG. 3 is a side elevational view of the filter plug component of the filter and pressure relief assembly of FIGS. 1 and 2.
Figure 4:
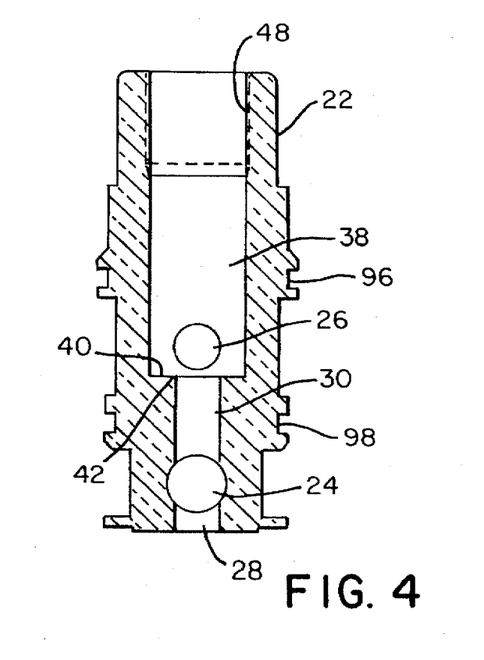
FIG. 4 is an axial cross-sectional view of the filter component of FIG. 3.

As can best be appreciated by means of additional reference being made to FIGS. 3 and 4, each one of the filter plugs 22 is seen to comprise a first, lower, horizontal through-bore 24 and a second, Upper, horizontal through-bore 26, and a first, lower, vertical passageway or bore 28 fluidically intersection and connected to the first, lower, horizontal through-bore 24, and a second, upper, vertical passageway or bore 30 fluidically intersecting and interconnecting the upper and lower horizontal through-bores 24 and 26. The filter block 16 is further provided with respective inlet bores or passageways 32 through which adhesive is conducted respectively into the cavities 18 by means of a suitable pump, not shown, operatively disposed within the adhesive supply unit of which the supply hopper 12 is a component part. Flow of the adhesive from the supply pump, not shown, is conducted into the inlet bores or passageways 32 by means of a supply conduit 34, and once the adhesive is fluidically conducted into the respective cavities 18, the adhesive enters the first, lower, horizontal through-bore 24 of each filter plug 22 and, under normal operating conditions, flows downwardly through its respective first, lower, vertical passageway or bore 28 and into its associated filter basket 20. The filter block 16 is further provided with a first pair of hose outlets 36 which are in fluidic communication, at one respective side thereof, with the lower end or part of each one of the cavities 18, and at an opposite respective side thereof with an outlet hose, not shown, which is operatively associated with and connected to an adhesive applicator, also not shown.

In accordance with the foregoing, therefore, the adhesive flows from the supply hopper 12, through the supply conduit 34, through the inlet bores 32 of the filter block 16, into the cavities 18, through the first, lower, horizontal through-bores 24 of the filter plugs 22, downwardly through the first, lower, vertical passageways or bores 28 of the filter plugs 22, through the filter baskets 20, and out of the first pair of hose outlets 36 defined within the filter block 16 such that the adhesive can be discharged or applied, in accordance with a predetermined adhesive application, by means of the outlet hoses and the adhesive applicator, not shown.

With reference continuing to be made to FIGS. 1–4, the upper part of each filter plug 22 is provided with an enlarged bore 38 which is fluidically connected to the second, upper, vertical passageway or bore 30 as well as to the second, upper, horizontal through-bore 26. The enlarged bore 38 and the second, upper, vertical bore 30 have an annular shoulder portion 40 defined therebetween, and the radially inner peripheral edge portion of the shoulder portion 40 defines a valve seat 42 upon which a valve member 44 is normally seated. The valve member 44 is normally biased toward and onto its valve seat 42 by means of a spring member 46 which is disposed within the enlarged bore 38. The uppermost, open end portion of the bore 38 is internally threaded so as to define a threaded socket 48, and a set screw 50 is threadedly engaged within the socket 48 so as to impress a predetermined amount of compression upon the spring member 46 whereby the valve member 44 will be unseated from its valve seat 42 by means of a predetermined amount of pressure within the adhesive flow system, and as more particularly determined by means of the pressure of the adhesive within the vertical bore 30, as variably or adjustably determined by means of the set screw 50. Once the predetermined pressure value, at which the valve member 44 will be unseated from its valve seat 42, is determined and set or calibrated, the threaded disposition or axial position of the set screw 50 with respect to the threaded socket 48 of the filter plug 22 may be fixed by means of a lock nut 52.

The filter block 16 is provided with a second pair of return ports 54 which are in fluidic communication, at one respective side thereof, with an upper end or part of each one of the cavities 18, and at an opposite respective side thereof with a return hose or conduit 56 which, in turn, is operatively connected at its opposite end to the supply hopper 12. A check valve 58 is disposed within conduit 56 so as to insure fluid flow of the adhesive within conduit 56 back toward the supply hopper 12. With the foregoing structure incorporated within the filter and pressure relief assembly 10 of the present invention, it can be further appreciated that, for example, when adhesive is not being discharged from the adhesive applicator, not shown, that is, during, in effect, the normal OFF portion of the ON/OFF cycling of the adhesive applicator apparatus, pressure build-up within the system will cause the adhesive supplied from the supply hopper 12 to be effectively recirculated back to the supply hopper 12 as a result of its flow through the supply conduits 34, the inlet bores or passageways 32 of the filter block 16, the horizontal through-bores 24 of the filter plugs 22, the vertical bores or passageways 30 of the filter plugs 22, past the valve members 44, through the horizontal through-bores 26, through the return ports 54, and through the return hose or conduit 56. Thus, the valve members 44 perform pressure relief functions within the assembly 10 under normal operative cycling of the system.

In order to monitor adhesive flow through the system, and particularly through the filter baskets 20, pressure taps are provided at predetermined locations both upstream and downstream of the filter baskets 20. As a result of such pressure taps, pressure data can be generated so as to provide operator personnel, for example, with indications of the proper functioning of the filters 20 of the system or the improper functioning thereof due, for example, to clogging of the same with debris whereby replacement of the filters 20 would be necessitated. The upstream pressure taps are shown at 60 as being operatively associated with the inlet bores 32, while the downstream pressure taps are illustrated at 62, and thus, the provision of such pressure taps 60 and 62 can be used to optimize filter change intervals. Even in the absence of the pressure taps 60 and 62, the operator personnel may detect clogged filter conditions, for example, or the improper temperature control of the adhesive material which would impart to the adhesive material improper viscosity characteristics, by abnormal flow characteristics of the adhesive material through the adhesive applicator. In either case, the filter baskets 20 would probably necessitate replacement. The present invention is therefore also concerned with the provision of a system by means of which the filter baskets 20 can be replaced or exchanged in a safe manner without operator personnel being exposed to operational hazards.

In accordance, therefore, with additional structural features of the present invention, and more particularly with respect to the particular structural components of the system of the present invention by means of which the filter baskets 20 and the filter plugs 22 are mounted within the filter block 16, spring members 64, in the form of, for example, perforate wave springs, are interposed between the upper ends of the filter baskets 20 and the lower ends of the filter plugs 22 so as to, in effect, bias the filter baskets 20 downwardly within the lower end portions of the cavities 18 while biasing the filter plugs 22 upwardly within the upper end portions of the cavities 18. The wave spring members 64 are of course perforate so as to permit the adhesive material to flow therethrough from the filter plugs 22 and into the filter baskets 20.

Figure 5:
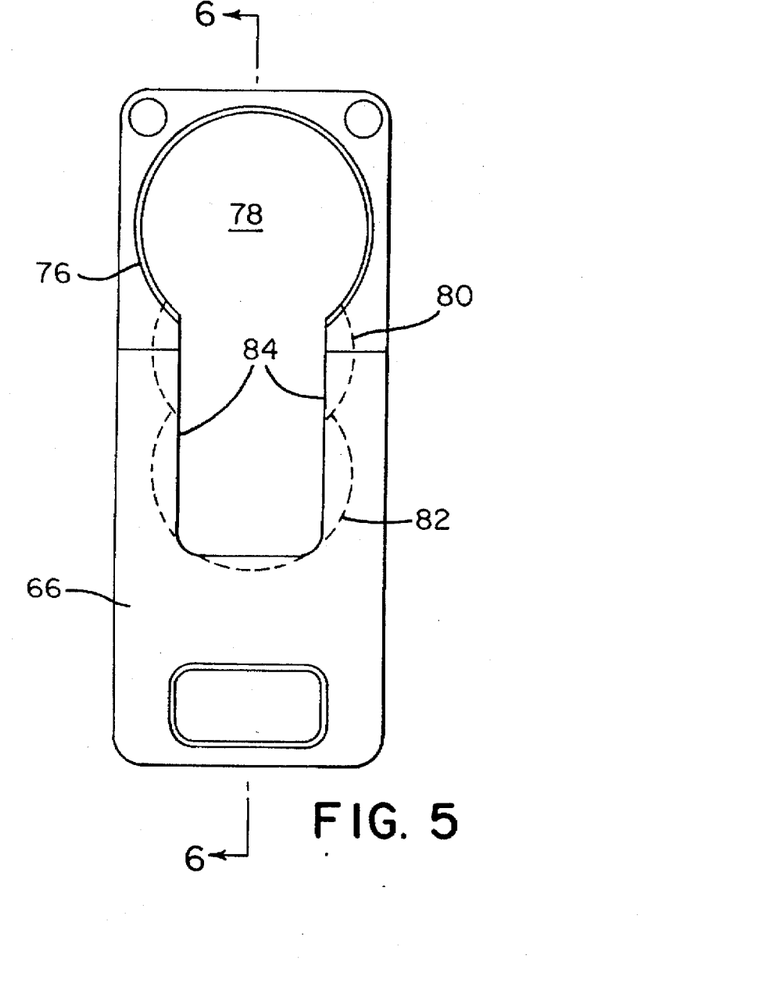
FIG. 5 is a top plan view of the slide plate component of the filter and pressure relief assembly of FIGS. 1 and 2.
Figure 6:
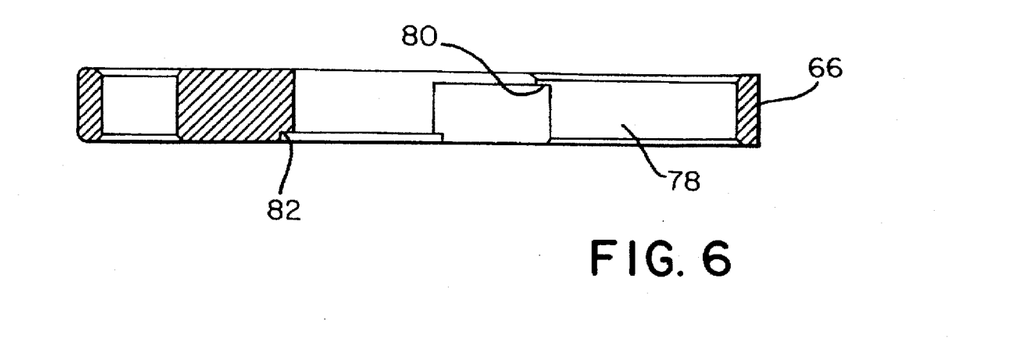
FIG. 6 is a cross-sectional view of the slide plate component of FIG. 5 as taken along the line 6—6 of FIG. 5.
Figure 7:
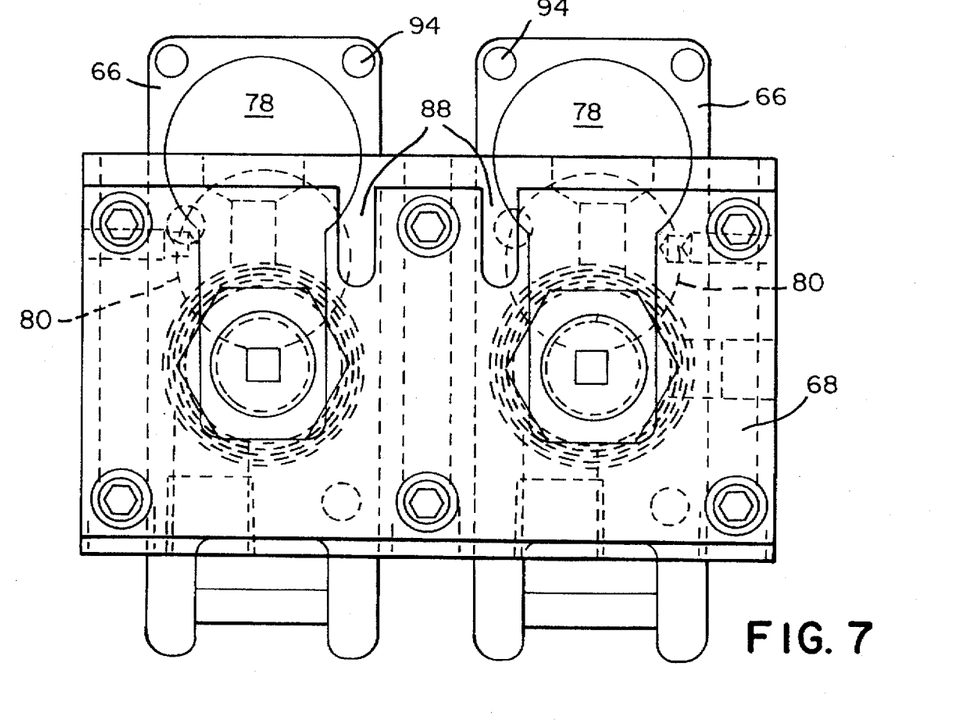
FIG. 7 is a top plan view of the filter and pressure relief assembly of FIGS. 1 and 2 showing, in particular, the disposition of the slide plate component of FIGS. 5 and 6 with respect to the filter and pressure relief assembly.
Figure 8:
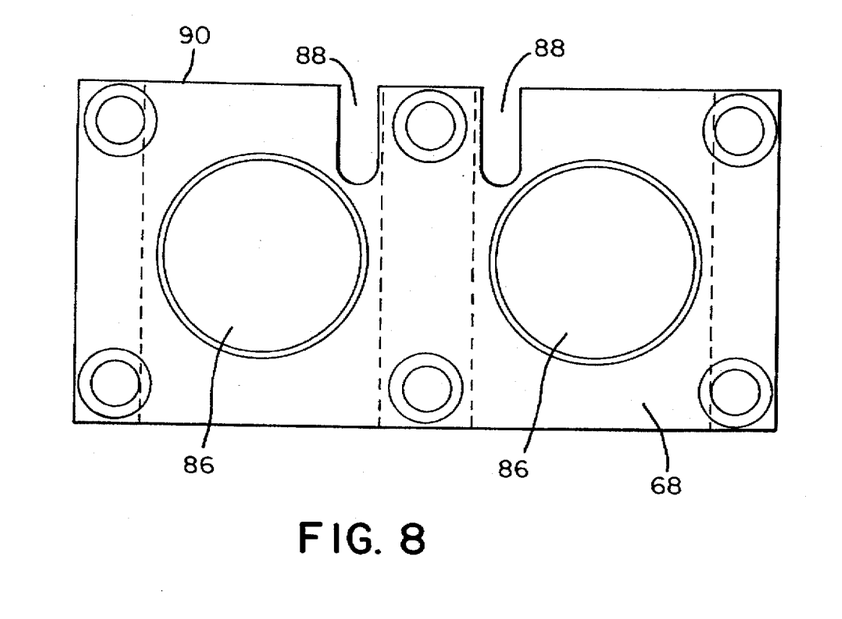
FIG. 8 is a top plan view of a slide frame component which slidably retains the slide plate component of FIGS. 5 and 6 within the filter and pressure relief assembly of FIGS. 1 and 2.

In order to retain the filter plug and filter basket assemblies properly disposed or mounted within the filter block 16, particularly under the influence of the biasing forces of the wave spring members 64 and the adhesive within the system, a slide plate 66, as specifically illustrated within FIGS. 5 and 6, is operatively engaged with each one of the filter plugs 22. A slide frame 68 is secured to the upper part of the filter block 16 by means of suitable screw or bolts fasteners 70 so as to slidably house the slide plates 66 upon the filter block 16. As seen in FIG. 3, the upper portion of each filter plug 22 comprises an annular shoulder portion 72 and a pair of flats 74 disposed upon diametrically opposite sides of the plug 22. Each slide plate 66 has a key-hole shaped slot 76 defined therein wherein the key-hole shaped slot 76 includes a through-bore portion 78 which corresponds to a first one of three slidable positions of the slide plate 66, with respect to the slide frame 68 and filter block 16, at which the through-bore portion 78 of the slide plate 66 will be coaxially disposed with respect to its associated filter plug 22 and filter basket 20 so as to permit removal of the latter components from the filter block 16. The slide plate 66 further comprises first and second undercut or counterbored portions 80 and 82 which define second and third slidable positions of the slide plate 66, with respect to the slide frame 68 and the filter block 16, at which the respective filter plug 22 is disposed within the filter block 16 at its partially inserted or retained position, and at its fully inserted or retained position, respectively, as will soon be more fully explained and understood hereinafter. At this time, it is to be understood that when the slide plate 66 is disposed at its second and third positions with respect to the slide frame 68 such that the counterbored portions 80 and 82 are coaxially aligned with the filter plug 22, the shoulder portion 72 of the filter plug 22 is engaged with the undersurface portion of the slide plate 66 which defines the counterbored section 80 or 82 such that the filter plug 22 is still retained within the filter block assembly by means of the overlying slide plate 66. At the same time, the oppositely disposed sidewalls 84 of the slide plate 66, which form parts of the key-hole shaped slot 76, engage the opposite flat wall portions 74 of the filter plug 22. This interactive structure facilitates the slidable movement of the slide plate 66 relative to the filter plug 22 when the slide plate 66 is moved between its three different positions, and in addition, prevents rotation of the filter plug 22 with respect to the slide plate 66 and the filter block 16 when the adjustment set screw 50 is threadedly engaged within the internal threaded socket 48 of the filter plug 22. The slide frame 68 is of course provided with a pair of through-bores 86 which are adapted to be coaxially aligned with the throughbore portion 78 of the slide plate 66 when the latter is disposed at its first position with respect to the slide frame 68 so as to permit the filter plugs 22 and the filter baskets 20 to be removed from the filter 16 assembly. The slide frame 68 is further provided with a pair of slots 88 within substantially central portions thereof, the slots 88 extending inwardly from a side edge portion 90 of the slide frame 68. Each of the slide plates 66 is provided with a pair of apertures 92, only one of which is shown in FIG. 1, and an upstanding guide pin 94 is adapted to be fixedly disposed within one of the apertures 92 of each plate 66 depending upon the particular disposition of the particular plate 66 with respect to the slide frame 68 as best seen in FIG. 7.

Referring again to FIGS. 1–4, each of the filter plugs 22 is provided with vertically or axially spaced annularly or peripherally recessed portions 96 and 98 which are adapted to house secondary and primary O-ring sealing members 100 and 102, respectively. A central region 104 of each filter block cavity 18 has a first predetermined diametrical extent, while an upper region 106 of each filter block cavity 18 has a second predetermined diametrical extent which is larger than the first predetermined diametrical extent of the central region 104. As can be seen from FIGS. 1 and 2, the O-ring members 102 and 100 respectively engage internal peripheral wall portions of the central and upper regions 104 and 106, respectively, so as to provide sealing for the filter plug assemblies 22 With respect to the cavities 18 of the filter blocks 16. The provision of the two O-ring sealing members 100 and 102 serves two primary functions. A first one of the two primary functions encompasses sealing redundancy so as to provide the system with a safety feature or procedure should, for example the primary O-ring sealing member 102 experience failure. In such a case, the secondary O-ring sealing member 100 would nevertheless provide the sealing capabilities to the system whereby, for example, the hot adhesive would not be forcefully discharged out of the filter block 16 and thereby present a safety hazard to operator personnel, and would be routed back to hopper 12 through ports 54.

The second primary function of providing the two sealing members 100 and 102 also encompasses safety procedures in connection with the filter and pressure relief assembly 10 of the present invention, particularly in connection with the exchange or replacement of the filter baskets 20 when in fact they need to be changed or replaced. In view of the fact that adhesive is supplied to or conducted into the filter block cavities 18 by means of the inlet passageways or ports 32 operatively connected to the adhesive supply conduit 34, pressurized adhesive will be disposed within the cavities 18 at elevational levels which are beneath the lower peripheral recessed portion 98 and the primary O-ring sealing member 102. As a result of such pressurization of the system, the filter plug assemblies 22 are constantly biased in an upward direction within the filter block cavities 18, however, the filter plug assemblies 22 are of course fixedly retained within the filter block 16 by means of the slide plate 66 and slide frame 68 components as noted hereinbefore, that is, when the slide plate 66 is disposed at its second or third positions 80 and 82 corresponding to the partially or fully retained positions of the filter plug assemblies 22 with respect to the filter block 16.

When the filter plugs 22 and the filter baskets 20 are to be removed from the filter block 16 so as to permit maintenance work to be performed upon the filter baskets 20, or alternatively, replacement of the filter baskets 20, the slide plate 66 must of course be moved to its first position 78 which corresponds to the full release position at which the filter plugs 22 and the filter baskets 20 may in fact be removed from the filter block 16. However, before the filter plugs 22 and the filter baskets 20 can be removed from the filter block 16, pressure within the system must first be relieved such that hot adhesive is not forcefully discharged or ejected from the filter block 16 and thereby present a safety hazard for operator personnel. Accordingly, operation of the supply pump, not shown, is terminated so as to initially reduce the pressure within the system and the filter block cavities 18, however, as has been noted hereinbefore, the pressure within the system and cavities 18 is not fully relieved merely by terminating operation of the adhesive supply pump because substantial residual pressure may be or often is still present within the system. Therefore, the applicator valves, not shown, disposed upon the adhesive dispensers or applicators, must be opened. This reduction of pressure within the system and cavities 18 thus permits the filter plugs 22 to be depressed downwardly against the upward bias of the pressurized adhesive within the system as well as against the upward bias of the wave springs 64. Normally, when the supply pump is in operation, the pressure within the system and cavities 18 will not permit the filter plugs 22 to be depressed downwardly. This is also a safety feature of the present invention system because if the plugs 22 cannot be depressed downwardly, engagement of the shoulders 72 of the filter plugs 22 with the counterbored portions 80 and 82 of the slide plates 66 prevents the slide plates 66 from being slidably moved from their second or third partial or full insertion positions 80 or 82 toward their first, full release position 78. Therefore, the filter plugs 22 and the filter baskets 20 cannot be removed from the system filter block 16 when the supply pump, not shown, is in operation.

When the filter plugs 22 are thus depressed downwardly against the residual adhesive pressure within the system and against the biasing force of the wave spring members 64, the slide plates 66 are able to be moved from their third, full retention positions 82 to their second, partial release positions 80 as a result of the disengagement of the shoulder portions 72 of the filter plugs 22 with respect to the counterbored sections 82 of the slide plates 66. Upon movement of the slide plates 66 to their second, partial release positions 80, and in view of the particular provision or disposition of the counterbored structures or undercut portions 80 and 82, as best seen in FIG. 6, when the filter plugs 22 are released from their depressed states, the filter plugs 22 will rise within the cavities 18 until the shoulder portions 72 of the plugs 22 engage the undercut or counterbored portions 80 of the slide plates 66, the filter plugs 22 rising under the influence of the wave spring members 64 returning to their normal, non-depressed positions, as well as under the influence of the residual adhesive pressure within the system. As a result of such rise of the filter plugs 22, the lower primary O-ring members 102 are now disposed within the enlarged diameter upper regions 106 of the filter block cavities 18, are therefore no longer engaged in sealing relationship with the smaller diameter central regions 104 of the filter block cavities 18, and are similarly not engaged in sealing relationship with the larger diameter upper regions 106 of the cavities 18 due to the differences in diametrical extents. Consequently, adhesive, disposed within the cavities 18 and exhibiting the previously noted residual pressure, can now, in effect, escape around the lower primary O-ring members 102 so as to flow back toward the supply hopper 12 through means of the return ports 54. When such residual pressure has thus been relieved, the slide plates 66 can be moved from their second, partial release positions 80 to their first, full release positions 78, after the filter plugs 22 have again been depressed, such that the shoulder portions 72 of the plugs 22 clear the counterbored portions 80 of the slide plates 66, whereby the filter plugs 22 and the filter baskets 20 can be safely removed from the filter block 16 without any danger of hot adhesive being forcefully discharged or ejected from the filter block 16 and thereby otherwise presenting a safety hazard to operator personnel. As has been noted hereinbefore, it is to be appreciated that the filter plugs 22 and filter baskets 20 can be removed from the system filter block 16 as a result of the particular interoperative structure comprising the slide plates 66 and the slide frame 68 without the necessity or requirement of using specialized tools.

With reference again being made to FIGS. 1 and 2, the filter block 16 is adapted to be heated to a temperature level of approximately 375° F., and accordingly, a suitable heating component 108 is disposed in operative association with a lower portion of filter block 16, while a temperature sensor 110 is disposed within the vicinity of component 108 so as to sense or determine the temperature level of block 16 and control component 108 through an electronic temperature controller, not shown. A clamp plate 112 fixedly secures heater 108 and sensor 110 to a lower portion of block 16. Heater 108 can comprise any suitable type of heater, such as an electrical resistance type, a conduit for heated water or combustion gases, and the like. A circuit breaker or resettable switch 114 is also provided upon block 16 within the vicinity of spring washers 64 so as to redundantly terminate power to heater 108 if excessive temperature levels are sensed by means of the temperature sensor 110. A heat insulating plate 116 is interposed between filter block 16 and supply hopper 12, and the filter block 16 has a junction box 118 operatively connected thereto or mounted thereon for housing the various electrical power supply components required for operation of the various components comprising the filter and pressure relief assembly 10 of the invention.

Thus, it may be seen that the present invention incorporates significant safety features or structural components within the overall filter and adhesive supply system so as to render the operation of the system safe and secure, and in addition, to facilitate the safe and secure replacement of the filter baskets or modules within the overall system. More particularly, in view of the dual O-ring sealing system, the overall system is provided with redundancy sealing capabilities during operation of the system. In addition, such dual O-ring sealing system provides controlled pressure relief for the system when the filter baskets or modules are to be serviced, replaced, or exchanged. Replacement of the filter baskets or modules is also substantially impossible to achieve while the system is being operated under normal operations and pressures whereby operation of the system supply pumps must initially be terminated or shut-down. Replacement or removal of the filter baskets or modules from the system is also able to be achieved without the requirement of using any special tools, and if internal pressures within the system build up to, in effect, over-pressurized conditions, the system also incorporates therein pressure relief means for routing pressurized adhesive back to the adhesive supply hopper.

Obviously, many modifications and variations of the present invention are possible in light of the above teachings. For example, while the two filter modules comprising the separate filter plugs 22 and separate filter baskets 20 have been illustrated as being operative, in effect, independently with respect to each other, except for the fact that they may be connected to a common applicator hose operatively connected to the outlets or ports 36, a cross channel 120, which is normally closed by means of a plug 122 disposed internally within the channel 120, may be opened by removing such plug 122, whereby operative pressure conditions, for example, within the two filter modules comprising in particular the filter baskets 20 are equalized. An access plug 124 is provided within the right side end of the filter block 16 so as to provide access to the cross channel 120 and the plug 122 normally disposed therein. It is therefore to be understood that within the scope of the appended claims, the present invention may be practiced otherwise than as specifically described herein.

What is claimed as new and desired to be protected by Letters Patent is:

1. A filter and pressure relief assembly for a fluid flow system, comprising:

a source of pressurized fluid;

a filter block having a cavity defined therein;

a first fluid conduit fluidically connecting said source of pressurized fluid to said cavity of said filter block so as to supply said pressurized fluid from said source of pressurized fluid to said cavity of said filter block;

a second fluid conduit fluidically connected to said cavity of said filter block so as to conduct said pressurized fluid from said cavity of said filter block to an applicator of said pressurized fluid;

filter means disposed within said cavity of said filter block for filtering said pressurized fluid as said pressurized fluid flows from said first fluid conduit, through said filter means, and through said second fluid conduit to said applicator;

filter plug means disposed within said filter block for maintaining said filter means within said filter block;

a third fluid conduit, separate from said first fluid conduit, fluidically connecting said cavity of said filter block to said source of pressurized fluid for returning pressurized fluid to said source of pressurized fluid when the pressure of said pressurized fluid within said cavity of said filter block is greater than a predetermined pressure value; and pressure relief means interposed between said first and third conduits and movably disposed within said filter plug means between a first position at which said pressure relief means blocks fluid flow between said first fluid conduit and said third fluid conduit whereby said pressurized fluid flows from said first fluid conduit to said second fluid conduit without flowing through said pressure relief means when the pressure level of said pressurized fluid is less than said predetermined pressure value, and a second position at which said pressure relief means permits fluid flow between said first fluid conduit and said third fluid conduit so as to reduce the pressure level of said pressurized fluid within said system by returning said pressurized fluid to said source of pressurized fluid when the pressure level of said pressurized fluid is greater than said predetermined pressure value.

2. The assembly as set forth in claim 1, wherein:

said pressure relief means comprises a pressure relief valve member; and said filter plug means has a valve seat defined internally thereof for seating said pressure relief valve member.

3. The assembly as set forth in claim 2, further comprising:

means adjustably mounted within said filter plug means and operatively engaged with said pressure relief valve member for adjustably determining said predetermined pressure value at which said pressure relief valve member will be unseated with respect to said valve seat so as to permit said fluid flow between said first and third fluid conduits.

4. The assembly as set forth in claim 3, wherein said means adjustably mounted within said filter plug means comprises:

a set screw threadedly engaged within said filter plug means; and a spring member interposed between and operatively engaged at opposite ends thereof with said set screw and said relief valve member for biasing said relief valve member onto said valve seat with a force predetermined by said adjustable threaded engagement of said set screw within said filter plug means.

5. The assembly as set forth in claim 1, wherein:

said source of pressurized fluid comprises an adhesive supply hopper for supplying pressurized adhesive to said system.

6. A filter and pressure relief assembly for a fluid flow system, comprising:

a source of pressurized fluid;

a filter block having a cavity defined therein;

a first fluid conduit fluidically connecting said source of pressurized fluid to said cavity of said filter block so as to supply said pressurized fluid from said source of pressurized fluid to said cavity of said filter block;

a second fluid conduit fluidically connected to said cavity of said filter block so as to conduct said pressurized fluid from said cavity of said filter block to an applicator of said pressurized fluid;

filter means removably disposed within said cavity of said filter block for filtering said pressurized fluid as said pressurized fluid flows from said first fluid conduit, through said filter means, and through said second fluid conduit to said applicator;

a third fluid conduit fluidically connecting said cavity of said filter block to said source of pressurized fluid for returning pressurized fluid to said source of pressurized fluid so as to relieve the pressure of said pressurized fluid within said cavity of said filter block from a predetermined pressure value, to which said pressurized fluid is normally pressurized when said pressurized fluid is conducted to said applicator, to a pressure value which is less than said predetermined pressure value in preparation for removal of said filter means from said cavity of said filter block; and filter plug means movably disposed within said cavity of said filter block between a first position at which said filter plug means seals said cavity of said filter block so as to prevent pressurized fluid from escaping outside of said filter block and wherein said filter plug means blocks fluidic communication between said first and third fluid conduits so as to prevent fluid flow between said first and third fluid conduits and thereby maintain the pressure of said pressurized fluid within said cavity at said predetermined pressure value, and a second position at which said filter plug means seals said cavity of said filter block so as to prevent pressurized fluid from escaping outside of said filter block and wherein said filter plug means permits fluidic communication between said first and third fluid conduits such that said pressurized fluid entering said cavity of said filter block through said first fluid conduit from said source of pressurized fluid can return to said source of pressurized fluid and thereby relieve said pressure of said pressurized fluid within said cavity of said filter block from said predetermined pressure value to said pressure value which is less than said predetermined pressure value in preparation for removal of said filter means from said cavity of said filter block whereby pressurized fluid will not be forcefully ejected from said filter block when said filter means is removed from said cavity of said filter block.

7. The assembly as set forth in claim 6, wherein:

said cavity of said filter block comprises a first cavity region having a first diametrical extent, and a second cavity region having a second diametrical extent which is larger than said first diametrical extent; and said filter plug means comprises first O-ring sealing means for sealingly engaging said second cavity region having said second larger diametrical extent when said filter plug means is disposed at either one of said first and second positions, and second O-ring sealing means for sealingly engaging said first cavity region when said filter plug means is disposed at said first position, and for being sealingly disengaged from both said first and second cavity regions when said filter plug means is disposed at said second position so as to permit said pressure of said pressurized fluid to be relieved and to permit said fluidic communication between said first and third fluid conduits.

8. The assembly as set forth in claim 6, further comprising:

means slidably mounted upon said filter block for movement between at least two positions for maintaining said filter plug means respectively at said first and second positions within said filter block.

9. The assembly as set forth in claim 8, wherein:

said means slidably mounted upon said filter block is movable to a third position at which said filter plug means and said filter means are able to be removed from said filter block.

10. The assembly as set forth in claim 9, wherein:

said means slidably mounted upon said filter block comprises a plate having a first counterbored portion defined therein for engaging said filter plug means when said plate is slidably moved to a first one of said two positions so as to maintain said filter plug means at said first position within said filter block, a second counterbored portion defined therein for engaging said filter plug means when said plate is slidably moved to a second one of said two positions so as to maintain said filter plug means at said second position within said filter block, and a through-bore for permitting said filter plug means and said filter means to pass through said plate when said plate is slidably moved to said third position so as to permit said filter plug means and said filter means to be removed from said filter block.

11. The assembly as set forth in claim 10, wherein:

said filter plug means comprises an annular shoulder portion for engaging said counterbored portions of said slidable plate.

12. The assembly as set forth in claim 11, further comprising:

spring means interposed between said filter plug means and said filter means for biasing said filter means into said filter block cavity and for biasing said annular shoulder portion of said filter plug means into engagement with at least one of said counterbored portions of said slidable plate.

13. The assembly as set forth in claim 9, wherein:

said filter plug means is movable within said cavity of said filter block along a first directional path comprising said first and second positions thereof; and said slidably mounted means is movable upon said filter block along a second directional path, comprising said first, second, and third positions thereof, which is substantially perpendicular to said first directional path of movement of said filter plug means.

14. The assembly as set forth in claim 6, further comprising:

pressure relief means movably disposed within said filter plug means between a first position at which said pressure relief means blocks fluid flow between said first and third fluid conduits so as to force said pressurized fluid to flow from said first fluid conduit to said second fluid conduit when the pressure level of said pressurized fluid is substantially at said predetermined pressure value, and a second position at which said pressure relief means permits fluid flow between said first and third fluid conduits so as to reduce the pressure level of said pressurized fluid within said system by returning said pressurized fluid to said source of pressurized fluid when the pressure level of said pressurized fluid is greater than said predetermined pressure value.

15. The assembly as set forth in claim 14, wherein:

said pressure relief means comprises a pressure relief valve member; and said filter plug means has a valve seat defined internally thereof for seating said pressure relief valve member.

16. The assembly as set forth in claim 15, further comprising:

means adjustably mounted within said filter plug means and operatively engaged with said pressure relief valve member for adjustably determining said predetermined pressure value at which said pressure relief valve member will be unseated from said valve seat so as to permit said fluid flow between said first and third fluid conduits.

17. The assembly as set forth in claim 16, wherein said means adjustably mounted within said filter plug means comprises:

a set screw threadedly engaged within said filter plug means; and a spring member interposed between and operatively engaged at opposite ends thereof with said set screw and said relief valve member for biasing said relief valve member onto said valve seat with a force predetermined by said adjustable threaded engagement of said set screw within said filter plug means.

18. The assembly as set forth in claim 6, wherein:

said source of pressurized fluid comprises an adhesive supply hopper for supplying pressurized adhesive to said system.

19. The assembly as set forth in claim 6, further comprising:

pressure tap means disposed upstream and downstream of said filter means for deriving pressure data concerning said pressurized fluid flow through said filter means in order to indicate the propriety of said removal of said filter means from said filter block for servicing of said filter means.

20. The assembly as set forth in claim 6, wherein:

said filter plug means comprises first O-ring sealing means disposed upon one side of said third fluid conduit remote from said first fluid conduit and sealingly engaged with a first peripheral portion of said filter cavity, and second O-ring sealing means disposed upon an opposite side of said third fluid conduit so as to be interposed between said first and third fluid conduits and sealingly engaged with a second peripheral portion of said filter block cavity such that said first and second O-ring sealing means provide said filter block cavity with redundancy sealing whereupon failure of said second O-ring sealing means, said first O-ring sealing rings will maintain the sealing of said filter block cavity while leakage of said pressurized fluid past said second failed O-ring sealing means will be returned to said source of pressurized fluid.

\* \* \* \* \*